(12) United States Patent
Tamal

(10) Patent No.: US 11,488,287 B2
(45) Date of Patent: *Nov. 1, 2022

(54) MEDICAL IMAGE DENOISING METHOD

(71) Applicant: Imam Abdulrahman Bin Faisal University, Dammam (SA)

(72) Inventor: Mahbubunnabi Tamal, Dammam (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 69 days.

This patent is subject to a terminal disclaimer.

(21) Appl. No.: 17/314,771

(22) Filed: May 7, 2021

(65) Prior Publication Data
US 2021/0264573 A1 Aug. 26, 2021

Related U.S. Application Data

(63) Continuation of application No. 15/964,428, filed on Apr. 27, 2018, now Pat. No. 11,049,221.

(51) Int. Cl.
*G06T 5/00* (2006.01)
*G06T 5/20* (2006.01)
*G06T 11/00* (2006.01)

(52) U.S. Cl.
CPC ........... *G06T 5/002* (2013.01); *G06T 5/20* (2013.01); *G06T 11/008* (2013.01); *G06T 2207/10081* (2013.01); *G06T 2207/10092* (2013.01); *G06T 2207/10104* (2013.01); *G06T 2207/10108* (2013.01); *G06T 2207/30168* (2013.01)

(58) Field of Classification Search
CPC ......... G06T 5/002; G06T 5/20; G06T 11/008; G06T 2207/10081; G06T 2207/10092; G06T 2207/10104; G06T 2207/10108; G06T 2207/30168; G06T 2211/424
See application file for complete search history.

(56) References Cited

U.S. PATENT DOCUMENTS

| 7,515,763 | B1 | 4/2009 | Zhong | |
| 2003/0128888 | A1 | 7/2003 | Li | |
| 2004/0071363 | A1* | 4/2004 | Kouri | G06K 9/00516 |
| | | | | 382/128 |
| 2006/0182340 | A1 | 8/2006 | Cardenas | |
| 2010/0286525 | A1 | 11/2010 | Osumi | |
| 2014/0064591 | A1* | 3/2014 | Sasaki | A61B 5/125 |
| | | | | 382/131 |

FOREIGN PATENT DOCUMENTS

WO 2014/094376 A1 6/2014

OTHER PUBLICATIONS

Eric Michel-Gonzalez, et al.; Geometric nonlinear diffusion filter and its application to X-ray imaging; Jun. 5, 2011; Features 1 and 2; pp. 2,5; https://biomedical-engineering-online.biomedcentral.com/articles/10.1186/1475-925X-10-47.

Gerig, G, et al.; Nonlinear anisotropic filtering of MRI data; Jun. 2, 1992; Features 1 and 2; pp. 1 and 2; https://www.lpi.tel.uva.es/muitic/pim/docus/gerig.pdf.

* cited by examiner

*Primary Examiner* — Amandeep Saini
(74) *Attorney, Agent, or Firm* — Oblon, McClelland, Maier & Neustadt, L.L.P.

(57) ABSTRACT

Aspects of the disclosure provide a method for denoising an image. The method can include receiving an acquired image from an image acquisition system, and processing the acquired image with a nonlinear diffusion coefficient based filter having a diffusion coefficient that is calculated using gradient vector orientation information in the acquired image.

5 Claims, 8 Drawing Sheets

FILLABLE SPHERES

Activity Concentration for contrast 2:1 and 4:1

|  | Contrast 2:1 (KBq/ml) | Contrast 4:1 (KBq/ml) |
|---|---|---|
| Sphere | 1668.52 | 2775.43 |
| Background | 838.59 | 697.24 |
| Measured Ratio | 1.99:1 | 3.98:1 |

SIGNAL TO NOISE RATIO (SNR) FOR DIFFERENT ACQUISITION DURATIONS AND CONTRASTS

| | | CONTRAST 2:1 | | | | CONTRAST 4:1 | | | |
|---|---|---|---|---|---|---|---|---|---|
| | | 900 SECONDS | 1200 SECONDS | 2000 SECONDS | 4000 SECONDS | 900 SECONDS | 1200 SECONDS | 2000 SECONDS | 4000 SECONDS |
| NO FILTER | MEAN | 9.59 | 10.69 | 12.92 | 15.89 | 9.81 | 11.04 | 13.12 | 15.92 |
| | CoV | 0.11 | 0.10 | 0.08 | 0.03 | 0.10 | 0.10 | 0.08 | 0.04 |
| GF | MEAN | 18.73 | 19.88 | 21.99 | 24.86 | 18.76 | 19.92 | 21.86 | 24.61 |
| | CoV | 0.070 | 0.069 | 0.042 | 0.008 | 0.07 | 0.07 | 0.05 | 0.03 |
| BF | MEAN | 16.48 | 17.99 | 21.16 | 25.84 | 21.30 | 23.56 | 27.54 | 34.31 |
| | CoV | 0.110 | 0.080 | 0.109 | 0.036 | 0.098 | 0.107 | 0.086 | 0.056 |
| NDF | MEAN | 34.39 | 36.47 | 40.80 | 42.39 | 37.11 | 38.09 | 40.55 | 42.07 |
| | CoV | 0.136 | 0.130 | 0.065 | 0.029 | 0.079 | 0.082 | 0.059 | 0.027 |
| GVOF | MEAN | 37.51 | 39.02 | 40.59 | 42.43 | 39.10 | 40.50 | 42.73 | 43.99 |
| | CoV | 0.067 | 0.065 | 0.039 | 0.012 | 0.036 | 0.041 | 0.047 | 0.033 |

FIG. 8

MEAN AND STANDARD DEVIATION OF RESOLUTION (mm) (FWHM) FOR DIFFERENT ACQUISITION DURATIONS AND CONTRASTS

| | | CONTRAST 2:1 | | | | CONTRAST 4:1 | | | |
|---|---|---|---|---|---|---|---|---|---|
| | | 900 SECONDS | 1200 SECONDS | 2000 SECONDS | 4000 SECONDS | 900 SECONDS | 1200 SECONDS | 2000 SECONDS | 4000 SECONDS |
| NO FILTER | MEAN | 6.57 | 5.16 | 6.59 | 6.52 | 4.97 | 6.76 | 6.99 | 7.29 |
| | SD | 2.46 | 2.00 | 1.66 | 2.33 | 1.26 | 1.63 | 0.85 | 1.39 |
| GF | MEAN | 7.13 | 7.85 | 7.88 | 9.26 | 8.63 | 7.80 | 7.82 | 8.86 |
| | SD | 0.37 | 0.47 | 1.00 | 0.77 | 1.96 | 1.33 | 0.52 | 0.91 |
| BF | MEAN | 5.96 | 5.92 | 7.24 | 6.89 | 5.86 | 6.64 | 6.56 | 6.67 |
| | SD | 1.51 | 1.95 | 2.23 | 0.75 | 2.68 | 1.94 | 0.65 | 0.81 |
| NDF | MEAN | 6.65 | 6.55 | 6.19 | 5.77 | 7.45 | 8.29 | 7.42 | 7.25 |
| | SD | 1.02 | 1.36 | 0.84 | 0.48 | 1.27 | 1.64 | 0.60 | 0.16 |
| GVOF | MEAN | 5.47 | 5.66 | 5.30 | 5.88 | 5.86 | 5.84 | 6.01 | 6.21 |
| | SD | 0.37 | 0.51 | 0.64 | 0.27 | 0.34 | 0.16 | 0.21 | 0.21 |

FIG. 9

MEDICAL IMAGE DENOISING METHOD

CROSS-REFERENCE TO RELATED APPLICATIONS

The present application is a Continuation of U.S. application Ser. No. 15/964,428, having a filing date of Apr. 27, 2018.

TECHNICAL FIELD

The present disclosure relates to the field of image processing, and more particularly to image processing system and method for noise reduction and edge detection in an image (e.g. a medical image, or an astronomical image).

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

In contrast to X-ray, ultrasound, and magnetic resonance which produce an anatomical map of the body, nuclear medicine imaging, such as positron emission tomography (PET), images a special distribution of radiopharmaceuticals introduced into a human body. The radiopharmaceuticals, also termed radiotracers, are compounds consisting of a chemical substrate linked to a radioactive element. Abnormal radiotracer uptake in a tissue, or an increase or decrease in a rate at which the radiotracer accumulates in a particular tissue is a strong indicator of disease. PET is based on positron-emitting radiopharmaceuticals. During a positron annihilation process, an electron and a positron collide, emitting two gamma ray photons. By detecting emissions of gamma ray photons with a PET scanner, a PET image can be acquired.

Radiotracer uptake measured by PET scanner is useful for detection, diagnosis and staging of diseases. Radiotracer uptake changes measured by PET scanner can be used to monitor response to a therapy during a treatment process. Standardized uptake value (SUV)—which is a normalized relative measure of radioactive concentration to remove the variation of injected radio activity and patient size, is widely used as a semi-quantitative parameter for clinical evaluations. SUVs derived from PET images are not robust and reproducible due to poor signal-to-noise ratio (SNR) and low spatial resolution of PET images. The uncertainties in longitudinal SUV measurements are even greater when SNR, size and contrast of lesion are subject to change.

To achieve satisfactory signal-to-noise (SNR) ratio of PET images, filtering can be performed during an image reconstruction process by incorporating a prior term in the statistical reconstruction algorithm. An example is provided in Qi, J. and R. M. Leahy, Iterative reconstruction techniques in emission computed tomography, Phys Med Biol, 2006. 51(15): p. R541-78, which is incorporated herein by reference in its entirety. Alternatively, filtering can be performed after completion of reconstruction, examples of which can be found in Nuyts, J. and J. A. Fessler, A penalized-likelihood image reconstruction method for emission tomography, compared to postsmoothed maximum-likelihood with matched spatial resolution, IEEE Trans Med Imaging, 2003. 22(9): p. 1042-52, and Nuyts, J., et al., Comparison between MAP and postprocessed ML for image reconstruction in emission tomography when anatomical knowledge is available, IEEE Trans Med Imaging, 2005. 24(5): p. 667-75, both of which are incorporated herein by reference in their entirety.

Conventionally, Gaussian filter (GF) with varying levels of full width half maximum (FWHM) accounting for the intrinsic resolutions of different scanners can be employed after the reconstruction known as post reconstruction filtering. Though GF provides linear and predictable SNR thereby facilitating identification and delineation of lesions, it reduces the spatial resolution of images, which is harmful to accurate quantification of tracer uptake.

Wavelet based filtering for PET is an alternative to GF as it is capable of smoothing based on the magnitude of noise. However, the method is still limited by capacity of processing edge discontinuities. A combination of wavelet and curvelet based denoising method is proposed to apply on PET images which complement the limitations of each other. Though the method is capable of preserving edges, it requires to compromise on quantitative accuracy.

Edge preserving bilateral filter (BF) is a type of locally adapted filter that incorporates both spatial and intensity information to improve spatial resolution. However, the BF fails to provide satisfactory results for low counts cases where the presence of high noise makes the intensity unreliable.

Nonlinear diffusion filter (NDF) is an alternative to BF filter which uses gradient magnitude to calculate diffusion coefficients. Due to high noise and limited resolution, determination of gradient of PET images is not straightforward especially for low contrast and low count cases. NDF is also known to increase noise instead of eliminating it in case image is corrupted by speckle noise.

For both clinical and quantitative perspective, an optimal image filtering method should improve SNR while preserving original structure, geometric and quantitative information. In addition, since in response assessment, noise, contrasts and size can change, the method should be robust enough to be implemented for different noise levels and contrasts without the need of adjusting the parameters for each scenario.

One objective of the present disclosure is to provide a nonlinear diffusion coefficient based filter image filter method that may be used with images having varying noise and contrast levels.

SUMMARY

Aspects of the disclosure provide a method for denoising an image. The method can include receiving an acquired image from an image acquisition system, and processing the acquired image with a nonlinear diffusion coefficient based filter having a diffusion coefficient that is calculated using gradient vector orientation information in the acquired image.

In one embodiment, the method can further include processing the acquired image with the nonlinear diffusion coefficient based filter having the diffusion coefficient that is calculated using both gradient vector magnitude information and gradient vector orientation information in the acquired image.

In one example, the nonlinear diffusion coefficient based filter is defined by following partial-differential-equation, $$\frac{\partial I(x, y, t)}{\partial t} = \nabla \cdot [c(x, y, t) \nabla I(x, y, t)],$$

$$I(t = 0) = I_0,$$

where I(x,y,t) represents an image, (x, y) represents a position of pixel in the image, t is a parameter indicating a scale level in a scale space of the image I(x,y,t), $I_0$ represents an initial image with t=0, $\nabla \cdot$ and $\nabla$ are divergence and gradient operators, respectively, and c(x, y,t) is the diffusion coefficient at a pixel located at position (x, y).

In one example, the diffusion coefficient is defined as, $$c(x, y, t) = \exp\left[-\left(\frac{\|\nabla I_\sigma(x, y, t)\| \times \alpha_\sigma(x, y, t)}{k}\right)^2\right],$$

where $I_\sigma(x,y,t)$ represents a smoothed image that is the initial image $I_0$ smoothed with a Gaussian kernel having a width of σ, k is a noise threshold, $\alpha_\sigma(x, y,t)$ is a term carrying gradient vector orientation information.

In one example, the term carrying gradient vector orientation information is defined as, $$\alpha_\sigma(x, y, t) = \left|\sum_{i=1}^{p}\sum_{j=1}^{q} \cos(\theta_{(i,j,t)})\right| = \left|\sum_{i=1}^{p}\sum_{j=1}^{q} \frac{\nabla I_\sigma(x, y, t) \times \nabla I_\sigma(i, j, t)}{\|\nabla I_\sigma(x, y, t)\| \times \|\nabla I_\sigma(i, j, t)\|}\right|,$$

wherein p×q represents a size of a window in terms of pixels that surrounds a position (x, y) in the smoothed image $I_\sigma(x,y,t)$, $\theta_{(i,j)}$ is an angle between a gradient vector $\nabla I_\sigma(i,j,t)$ and a gradient vector $\nabla I_\sigma(x,y,t)$.

In various embodiments, the acquired image can be one of an X-ray image, a computed tomography (CT) image, an magnetic resonance imaging (MM) image, an ultrasound image, a nuclear medicine image, a positron emission tomography (PET) image, and a single-photon emission computed tomography (SPECT)) image, an astronomical image. In various examples, the acquired image can be a two-dimensional (2D) or three-dimensional (3D) medical image.

Aspects of the disclosure provide an apparatus for denoising an image. The apparatus can include a memory storage including instructions, and one or more processors in communication with the memory, wherein the one or more processors execute the instructions to receive an acquired image from an image acquisition system, and process the acquired image with a nonlinear diffusion coefficient based filter having a diffusion coefficient that is calculated using gradient vector orientation information in the acquired image.

Aspects of the disclosure provide a non-transitory computer-readable medium having computer readable instructions stored thereon which, when executed by a processor, cause the processor to perform the method for denoising an image.

BRIEF DESCRIPTION OF THE DRAWINGS

Various embodiments of this disclosure that are proposed as examples will be described in detail with reference to the following figures, wherein like numerals reference like elements, and wherein:

FIG. 8 shows mean SNR and coefficient of variation CoV of SNR of five realizations for all methods and contrasts;

FIG. 9 shows mean and standard deviation of resolution of five realizations;

DETAILED DESCRIPTION OF EMBODIMENTS

Figure 1:
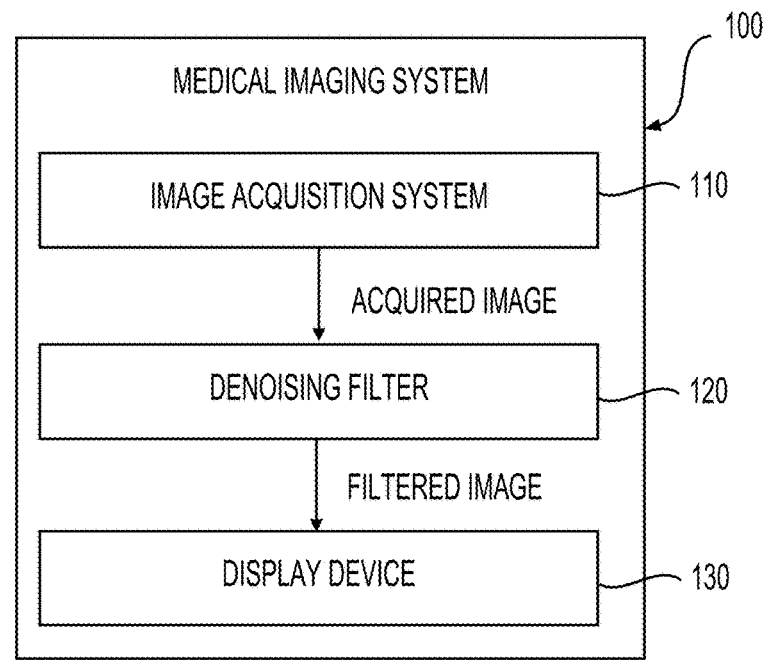
FIG. 1 shows an example medical imaging system according to some embodiments of the disclosure.

FIG. 1 shows an example medical imaging system 100 according to some embodiments of the disclosure. The medical imaging system 100 can include an image acquisition system 110, a denoising filter 120, and a display device 130. The medical imaging system 100 can generate images of internal structures of a human body, for example, for clinical analysis and medical intervention purposes.

The image acquisition system 110 can be configured to acquire images of organs or tissues with one or more imaging technologies. In various embodiments, the imaging technologies can be X-ray imaging, X-ray computed Tomography (CT), magnetic resonance imaging (MRI), ultrasonography, nuclear medicine imaging (e.g. positron emission tomography (PET), and single-photon emission computed tomography (SPECT)), and the like. Accordingly, in various embodiments, the image acquisition system 110 can be an X-ray imaging device, a CT scanner, an MM scanner, an ultrasound imaging device, a nuclear medicine imaging device, and the like.

The acquired images generated from the image acquisition system 110 can be in a form of a two-dimensional (2D) or three-dimensional (3D) image. A 2D image can include an array of pixels each having a sample value indicating brightness or an intensity of a detected signal around position of the respective pixel. A 3D image can include pixels (also termed voxels) located on a regular grid in 3D space each having a sample value indicating brightness or an intensity of a detected signal around position of a respective voxel.

The acquired images can include noise that mixed with desired signals at each pixels or voxels. For examples, the acquired images typically include Gaussian noise. In addition, due to problems of inadequate signal detection operations associated with imaging devices, image reconstruction algorithms, low dosage of scanning agent, and the like, other types of noise may be introduced into the acquired images. The noise in the acquired images can degrade quality of the acquired images, and cause an adverse influence on diagnosis of a doctor, or accuracy of subsequent image processing and analysis operations.

The denoising filter 120 can be configured to reduce noise in the acquired images by employment of one or more noise reduction filters. For example, the noise reduction filters can be a Gaussian filter (GF), a wavelet based filter, a curvelet based filter, a bilateral filter (BF), a nonlinear diffusion filter (NDF), and the like. Particularly, in one embodiment, a gradient vector orientation based nonlinear diffusion filter (GVOF) is used to denoise the acquired images. The GVOF calculates diffusion coefficients using both gradient vector magnitude of a pixel and gradient vector orientation information of pixels surrounding the pixel.

Filtered images can be generated from the denoising filter 120 as a result of a filtering operation at the denoising filter 120, and output to a user for analysis. For example, the filtered image can be displayed to the display device 130, such as a monitor, or printed out. Alternatively, the filtered images may undergo further image processing before being displayed. For example, the further image processing can include segmentation, registration, visualization, and the like.

Figure 2:
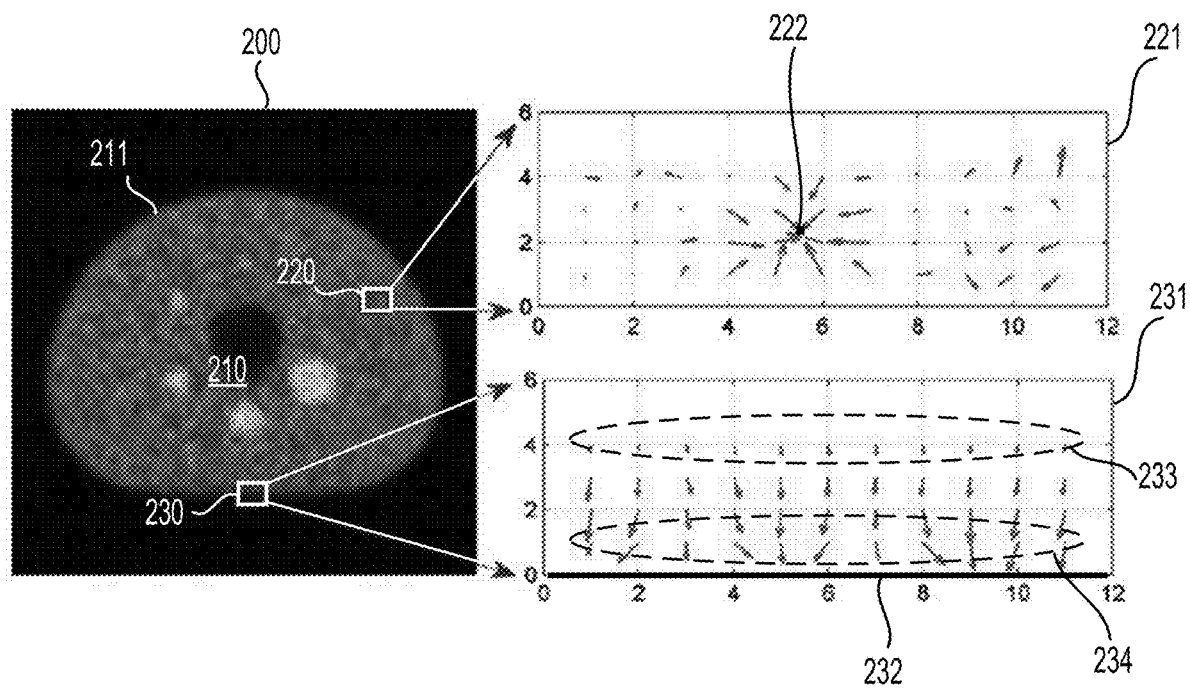
FIG. 2 shows an example of a 2D acquired image.

FIG. 2 shows an example of a 2D acquired image 210 generated from the image acquisition system 110 in FIG. 1 example and to be processed by the denoising filter 120. The acquired image 210 includes an object represented by a region 210 surrounded by a boundary 211. Gradient vectors corresponding to each pixel inside the region 210 are calculated that form a gradient vector field. As shown, two specific areas 220 and 230 are selected and magnified such that gradient vectors can be seen on two magnified areas 221 and 231. Each gradient vector is originated from a position of a respective pixel. Each gradient vector can represent a maximum change rate of pixel values along a specific direction from a respective pixel, and can be determined based on pixel values of pixels near the respective pixel. Accordingly, variations of directions and magnitudes of the gradient vectors can indicate variations of pixel values within the region 210, which in turn can indicate structures captured by the image 200.

For example, the area 231 includes an edge 232 which is part of the boundary 211. Generally, an edge structure captured in an image corresponds to a boundary separating two regions. Within each of the two regions, pixel values do not vary or variations of pixel values are within a small range. In contrast, when crossing the boundary, pixel values near the boundary change significantly compared with within the two regions. Accordingly, magnitudes of gradient vectors become greater when locations of respective gradient vectors are getting closer to an edge 232, due to that pixel values change more significantly in area 234 which is closer to the edge 232 compared with in area 233. Thus, larger magnitudes of gradient vectors can indicate an edge structure that may present near the vicinity of the respective gradient vectors.

Based on the above observation, a conventional NDF is developed to denoise an acquired image while preserving edge structures at the same time. The conventional NDF can be used to process the acquired image 200. The conventional NDF exploits information of changing magnitudes of gradient vectors to get knowledge of presence of structures in a local area, and for example, accordingly adjust a smoothing strength applied over this local area. An example of such a conventional NDF is described in the work of Perona, P. and J. Malik, Scale-space and edge detection using anisotropic diffusion, IEEE Transactions on Pattern Analysis and Machine Intelligence, 1990. 12(7): p. 629-639, which is incorporated herein by reference in its entirety.

Specifically, Perona and Malik introduces a non-linear anisotropic diffusion process for image processing which can be represented by the following partial-differential-equation (PDE), $$\frac{\partial I(x, y, t)}{\partial t} = \nabla \cdot [c(x, y, t)\nabla I(x, y, t)], \quad (1)$$
$$I(t = 0) = I_0.$$

In the PDE (1), I(x,y,t) represents an image, t is a parameter indicating a scale level in a scale space of the image I(x,y,t), $I_0$ represents an initial image with t=0, $\nabla \cdot$ and $\nabla$ are divergence and gradient operators, respectively, and c(x, y,t) is referred to as a non-linear diffusion coefficient Corresponding to the parameter t assuming a specific value, solving the PDE (1) results a denoised image. Thus, the equation (1) can be used to represent the conventional NDF.

The PDE (1) can be used to describe an image denoising process as well as a physical process of diffusion or heat conduction. Thus, based on the PDE (1), an image denoising process can be interpreted as an analogy of a physical diffusion process, and the diffusion coefficient c(x, y,t) can be used to control the denoising process. For example, the diffusion coefficient c(x, y,t) can be configured or defined to be a function of a gradient vector magnitude of a pixel, and represented as, $$c(x,y,t)=g(\|\nabla I(x,y,t)\|), \quad (2)$$

where $\|\nabla I(x,y,t)\|$ represents a magnitude of the gradient vector $\nabla I(x,y,t)$ at a position (x, y), and g(.) represents a function, referred to as a diffusion function. If the magnitude of gradient vector $\nabla I(x,y,t)$ is large (which indicates an edge is present), then, due to effect of the diffusion function g(.), the diffusion coefficient c(x,y,t) can have a small value. Consequently, the diffusion can be controlled to be low and an edge near the respective pixel can be preserved (a small diffusion coefficient means that a smoothing operation is performed with a low strength). If the magnitude of gradient vector $\nabla I(x,y,t)$ is small (which indicates no structure is present), then the diffusion can be controlled to be fast, and a region near the respective pixel can be heavily smoothed. In this way, noise in an acquired image can be removed while edge structures can be preserved during the denoising process based on the diffusion coefficient that is a function of a gradient vector magnitude at a pixel.

An example of the diffusion coefficient function is shown below, $$c(x, y, t) = \exp\left[-\left(\frac{\|\nabla I_\sigma(x, y, t)\|}{k}\right)^2\right]. \quad (3)$$

In equation (3), $I_\sigma(x,y,t)$ is an image smoothed with a Gaussian kernel of width σ. This smoothing operation can avoid oscillations of $\nabla I_\sigma(x,y,t)$ caused by signals in a noisy image and the smoothing is applied only once on the original noisy image in one example. In equation (3), k is a noise threshold that controls an amount of diffusion to be applied in the diffusion process. In alternative examples, other forms of diffusion coefficients are employed. Examples of other forms of diffusion coefficients are described in Blanc-Feraud, L., et al. Nonlinear image processing: modeling and fast algorithm for regularization with edge detection, in Proceedings, International Conference on Image Processing. 1995, and Bajla, I., M. Marusiak, and M. Sramek, Anisotropic filtering of MRI data based upon image gradient histogram, Lecture Notes in Computer Science, 1993. 719: p. 90-97, both of which are incorporated herein by reference in their entirety.

Although the above conventional NDF can be used to eliminate noise and preserve or enhance edge structures, the above conventional NDF tends to fail when gradient magnitudes are not evaluable (for example, when edge is not continuous and/or in the presence of high noise, since gradient operation amplifies noise), and can even enhance speckle noise instead of removing it.

According to the disclosure, the GVOF can overcome limitations of the conventional NDF for denoising acquired images. The GVOF can not only consider magnitudes of gradient vectors but also orientations of gradient vectors when determining a denoising strength applied to a local area. For example, as shown FIG. 2, the area 221 includes an object 222 caused by noise. The object 222 is undesired and can thus be referred to as a false object 222. As can be seen, gradient vectors around the false object 222 show a different characteristic compared with gradient vectors near the edge 232 in area 234. Specifically, directions of gradient vectors surrounding the false object 222 are towards the false object 222, and can be seen as being randomly orientated in different directions. While directions of gradient vectors in area 234 near the edge 232 are systematic, and oriented similarly towards the edge 232. Thus, gradient vector orientation information can be used to distinguish a false structure from an edge structure.

In order to exploit the gradient vector orientation information, the GVOF uses a different form of diffusion function g(.) to represent the diffusion coefficient as shown below, $$c(x, y, t) = \exp\left[-\left(\frac{\|\nabla I_\sigma(x, y, t)\| \times \alpha_\sigma(x, y, t)}{k}\right)^2\right], \quad (4)$$

$$\alpha_\sigma(x, y, t) = \left|\sum_{i=1}^{p}\sum_{j=1}^{q}\cos(\theta_{(i,j,t)})\right| = \left|\sum_{i=1}^{p}\sum_{j=1}^{q}\frac{\nabla I_\sigma(x, y, t) \times \nabla I_\sigma(i, j, t)}{\|\nabla I_\sigma(x, y, t)\| \times \|\nabla I_\sigma(i, j, t)\|}\right|.$$

c(x, y, t) represents the diffusion coefficient at a pixel located at position (x, y), $I_\sigma$(x,y,t) represents a smoothed image that is an initial image (acquired image) smoothed with a Gaussian kernel having a width of σ, k is a noise threshold that controls an amount of diffusion (smoothing strength) to be applied in the diffusion process, and $\nabla I_\sigma$(x,y,t) represents a gradient vector at position (x, y).

A new term $\alpha_\sigma$(x, y,t), as defined by equation (5), is introduced into the diffusion coefficient which carries gradient vector orientation information. Specifically, a window surrounding the current position (x, y, t) in the smoothed current image $I_\sigma$(x,y,t) is defined which can have a size of p×q pixels. Accordingly, $\nabla I_\sigma$(i,j,t) can represent a gradient vector at position (i, j) within the window of p×q pixels. An angle between the gradient vector $\nabla I_\sigma$(i,j,t) and the gradient vector $\nabla I_\sigma$(x,y,t) can be represented as $\theta_{(i,j,t)}$. Thus, as shown in equation (5), the term $\alpha_\sigma$(x, y,t) equals to an absolute value of a sum of cosines $\cos(\theta_{(i,j,t)})$ of angles $\theta_{(i,j,t)}$ (that correspond to each gradient vector $\nabla I_\sigma$(i,j,t) with respect to the gradient vector $\nabla I_\sigma$(x,y,t)). Accordingly, the term $\alpha_\sigma$(x, y,t) can vary in a range of 0 to 1. Equation (6) is used to restrict the minimum and maximum values of $\alpha_\sigma$(x, y,t) between to 0 and 1, $$\alpha_\sigma(x, y, t) = \frac{\alpha_\sigma(x, y, t) - \min(\alpha_\sigma(x, y, t))}{\max(\alpha_\sigma(x, y, t)) - \min(\alpha_\sigma(x, y, t))} \quad (6)$$

For example, corresponding to a scenario of the false structure 222 in FIG. 2, the sum of cosine of the angles $\theta_{(x,y,t)}$ at pixel (x,y,t) within a window surrounding the false structure 222 can be random. Thus, an absolute value of the sum of cos ($\theta_{(i,j,t)}$) can be a value close to 0, and the $\alpha_\sigma$(x, y,t) can be a value close to 0. Assuming $\alpha_\sigma$(x, y,t)=0 that is indicative of randomness in gradient vector orientations, when considered together with the gradient vector magnitude information (represented by $\nabla I_\sigma$(x,y,t)), the diffusion coefficient, c (x, y,t) can have a value of 1, which indicates a heavy smooth operation around the false structure 222. In contrast, corresponding to a scenario of the edge 232 in FIG. 2, the sum of cosine of the angles $\theta_{(x,y,t)}$ at pixel (x,y,t) within a window near the edge 232 can have similar vales. Thus, an absolute value of a sum of cos ($\theta_{(x,y,t)}$) can be close to 1. Combined with gradient vector magnitude information represented by $\nabla I_\sigma$(x,y,t), a diffusion coefficient c(x, y,t) having a smaller value may result, which may stop diffusion near the edge 232, or in other words, cause a smooth operation near the edge structure 232 with a smaller strength.

In one example, different from the equation (4), a GVOF can take a form as follows, $$c(x, y, t) = \exp\left[-\left(\frac{\alpha_\sigma(x, y, t)}{k}\right)^2\right], \quad (7)$$

where the term $\|\nabla I_\sigma(x,y,t)\|$ representing gradient vector magnitude information is removed.

In one example, a 3D image is acquired that includes a set of 2D slice images that are stacked together to form the 3D image. Each 2D slice image can be processed with a GVOF. Subsequently, filtered slice images resulting from the GVOF filtering processing can be combined to form a filtered 3D image.

An experiment is described below. In the experiment, PET images with varying noise levels and contrasts are acquired using a standard NEMA torso phantom, and the GVOF is compared with GF, BF, and NDF to remove noise in the acquired PET images. Medical images can be acquired with different imaging modalities, such as X-ray, MRI, Ultra sound, PET, and the like. Noise characteristics of different imaging modalities can be different. Among different imaging modalities, PET which depends on photon counting events is known to have the worst SNR and poorest image resolution. As shown by the experiment, conventional GF, BF, and NDF are qualitatively and quantitatively suboptimal for PET images. For example, with those conventional filtering methods, edges cannot directly be determined, and filtered image quality can also depend on variations of contrast and noise. The GVOF shows a higher performance than the conventional methods for preserving edge structures in presence of high noise and poor resolution. The GVOF is robust against variations in contrast and noise, which makes the GVOF suitable for measurement of response to a therapy process. The GVOF can also be applicable for other types of images which are corrupted by a high level of noise, such as astronomical images.

Materials And Methods of the Experiment

Figures 3, 4:
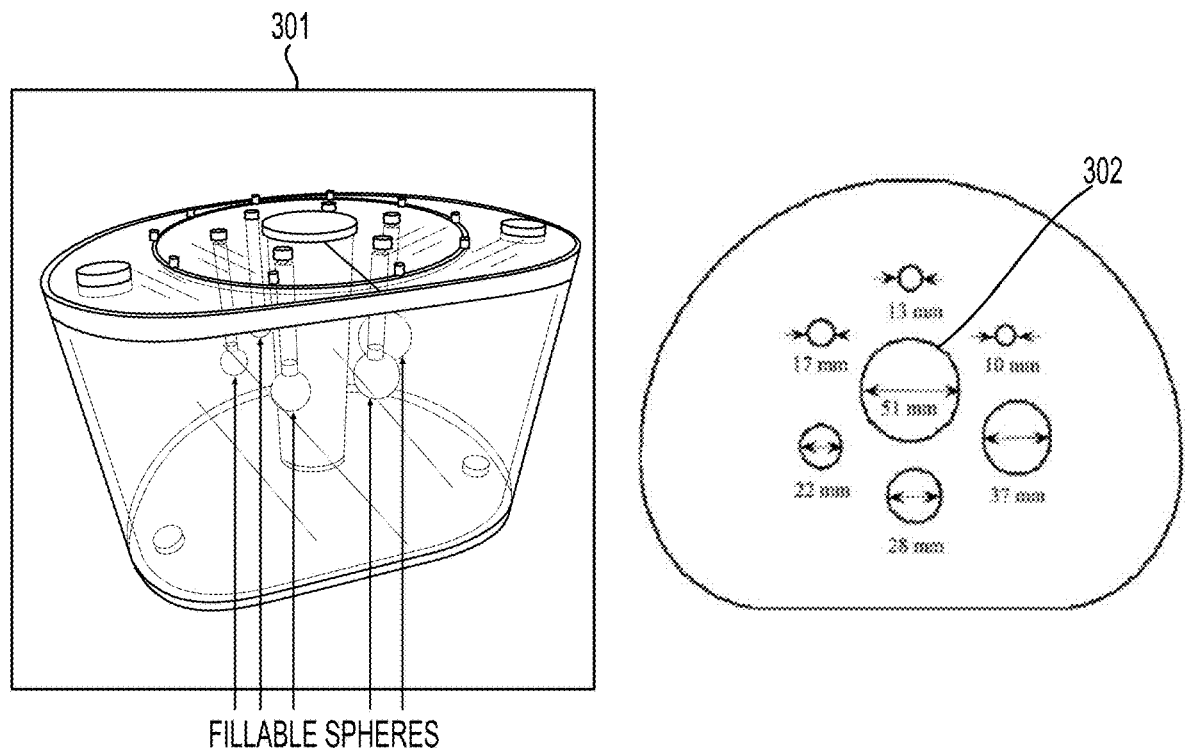
FIG. 3 shows a NEMA/IEC PET torso phantom containing six fillable spheres.
FIG. 4 shows activity ratios between spheres and background.

FIG. 3 shows a NEMA/IEC PET torso phantom 301 containing six fillable spheres, and dimensions of each sphere. A dimension of a cylindrical cold central insert 302 (51 mm in diameter) is also shown. As shown, the six spheres have diameters of 10, 13, 17, 22, 28 and 37 mm corresponding to volumes of 0.52, 1.15, 2.57, 5.58, 11.49 and 26.52 ml. The six spheres are filled with F-18 solutions to yield two different contrasts between hot spheres and colder uniform background (2:1 and 4:1). Activity ratios between spheres and background are shown in FIG. 4.

Phantom data are acquired in a 3D mode on the TrueV PET-CT scanner (Siemens, USA) for 120 minutes which provides 109 image planes or slices covering a 21.6 cm axial FOV (field of view). Images are reconstructed into a 256×256×109 matrix with voxel dimensions of 2.67×2.67×2.00 mm using OSEM reconstruction algorithm with 4 iterations and 21 subsets for five different scan durations (900, 1200, 2000 and 4000 seconds [15, 20, 33.3 and 66.6 minutes]) to represent different levels of noise. A starting time of each static frame are shifted to reconstruct five different non-overlapping and overlapping realizations for all durations. All reconstructed images are smoothed with the GVOF after applying decay correction and performance of the new filter is then compared with decay corrected images smoothed with a 4-mm FWHM (full width at half maximum) GF, BF and NDF.

SNR of an image is measured by placing a fixed size ROI of 26.52 ml in the background away from the hot spheres to minimize the spill in and partial volume effects and defined according to, $$SNR = 20\log_{10}\left(\frac{\mu_{ROI}}{\sigma_{ROI}}\right) \qquad (8)$$

where $\mu_{ROI}$ and $\sigma_{ROI}$ are the mean and standard deviation within the ROI.

Contrast noise ratio (CNR) is used to evaluate the contrast as a function of noise defined as the ratio of the difference of signal intensities of two regions of interest to the background noise, $$CNR = \frac{\mu_{SP} - \mu_{BG}}{\sigma_{BG}} \qquad (9)$$

where $\mu_{SP}$ and $\mu_{BG}$ are the mean activity within the sphere and background. For estimating $\mu_{SP}$, the ROI was first estimated for each sphere using the calculated boundaries based on the known diameter and position of each sphere and eroded by 3×3 structural element to remove the partial volume effect. $\mu_{BG}$ is estimated by placing a fixed size ROI of 26.52 ml in the background away from the hot sphere as similar for SNR measurement. Since CNR indicates how visible or detectable the hot sphere is in contrast to the background within which the hot sphere is located, it is also known as detectability.

Resolution as full width at half maximum (FWHM) was derived from the standard deviation of a 1D Gaussian function which was fitted to the absolute gradient of the edge profile of each image.

For assessing the accuracy of measurement of activity concentration after smoothing with different filters, percentage bias is calculated using the mean of maximum activity of five realizations ($AC_{max}^{mean}$) within each sphere and true measured activity concentration (TAC) that was used to fill each sphere and is given by, $$\% \text{ Bias} = 100 \times \left(\frac{AC_{max}^{mean} - TAC}{TAC}\right) \qquad (10)$$

where $AC_{max}$ represents $SUV_{max}$ without correction for weight and injected dose. The reproducibility of was measured as the percent difference between the two measurements and is calculated by considering the highest and lowest activity amongst five realizations within each sphere ($AC_{max-highest}$ and $AC_{max-lowest}$ respectively). The % difference equation in this case is given by, $$\% \text{ difference} = 100 \times \left(\frac{AC_{max-highest} - AC_{max-lowest}}{\frac{1}{2}(AC_{max-highest} + AC_{max-lowest})}\right) \qquad (11)$$

Experiment Results

Figure 5:
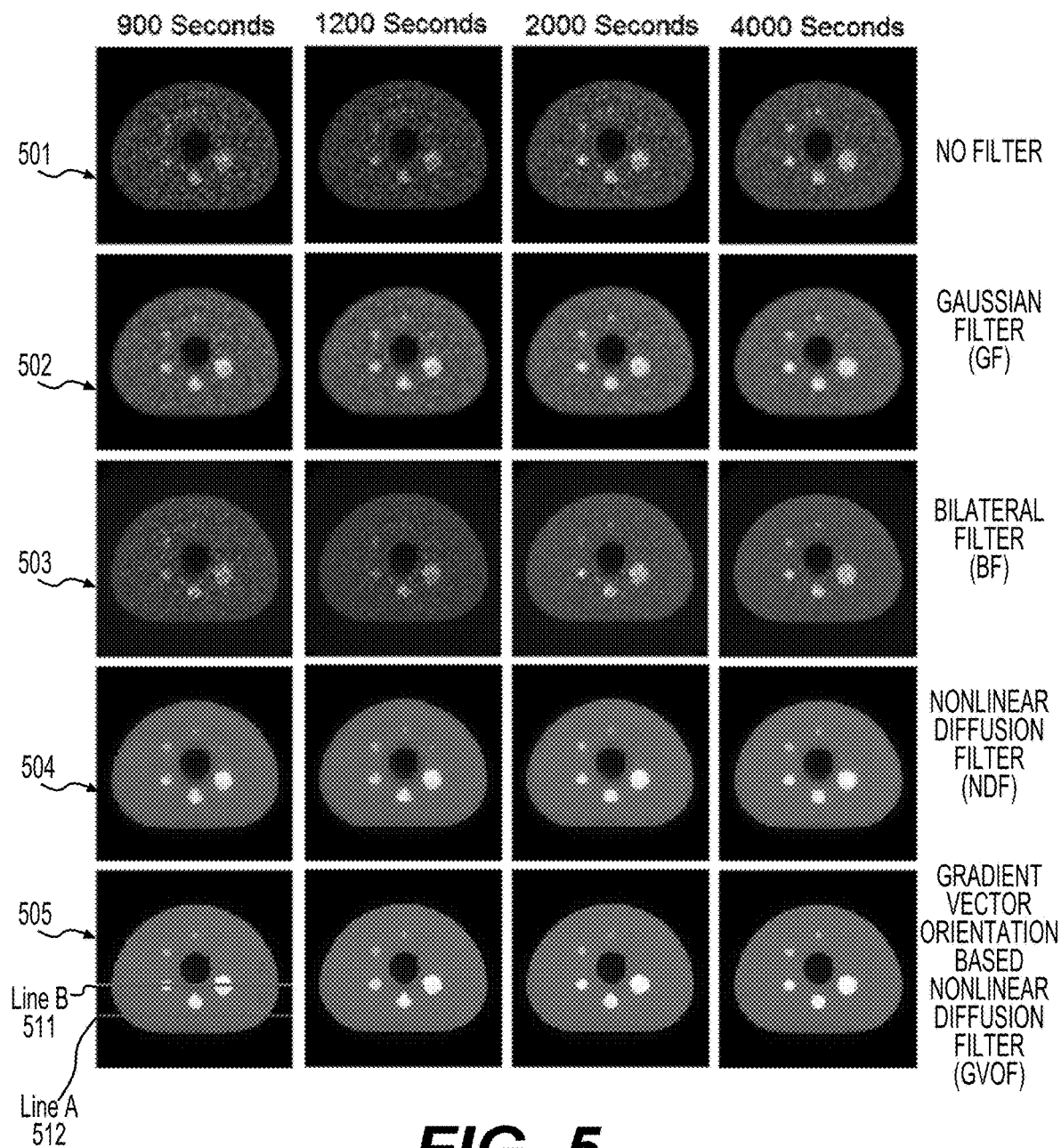
FIG. 5 shows reconstructed slice images without any filtering and slice images after application of different filtering methods in five rows.

FIG. 5 shows reconstructed slice images without any filtering and slice images after application of different filtering methods in rows 501-505. Each row of images corresponding to four different acquisition (scanning) durations, 900 seconds, 1200 seconds, 200 seconds, and 4000 seconds. As shown, it is clearly evident that GF method improves the image quality by removing noise. Nonetheless the images appear blurred. BF provides images with higher resolution compared to GF for 2000 and 4000 seconds acquisition duration. However, for 900 and 1200 seconds acquisition durations, quality of the images filtered by BF method is inferior compared to GF method. NDF and GVOF provide visually better quality images compared to all other methods. The quality of images is similar for 2000 and 4000 seconds for these two methods. For 900 and 1200 seconds acquisition durations GVOF appears superior to NDF.

Figure 6:
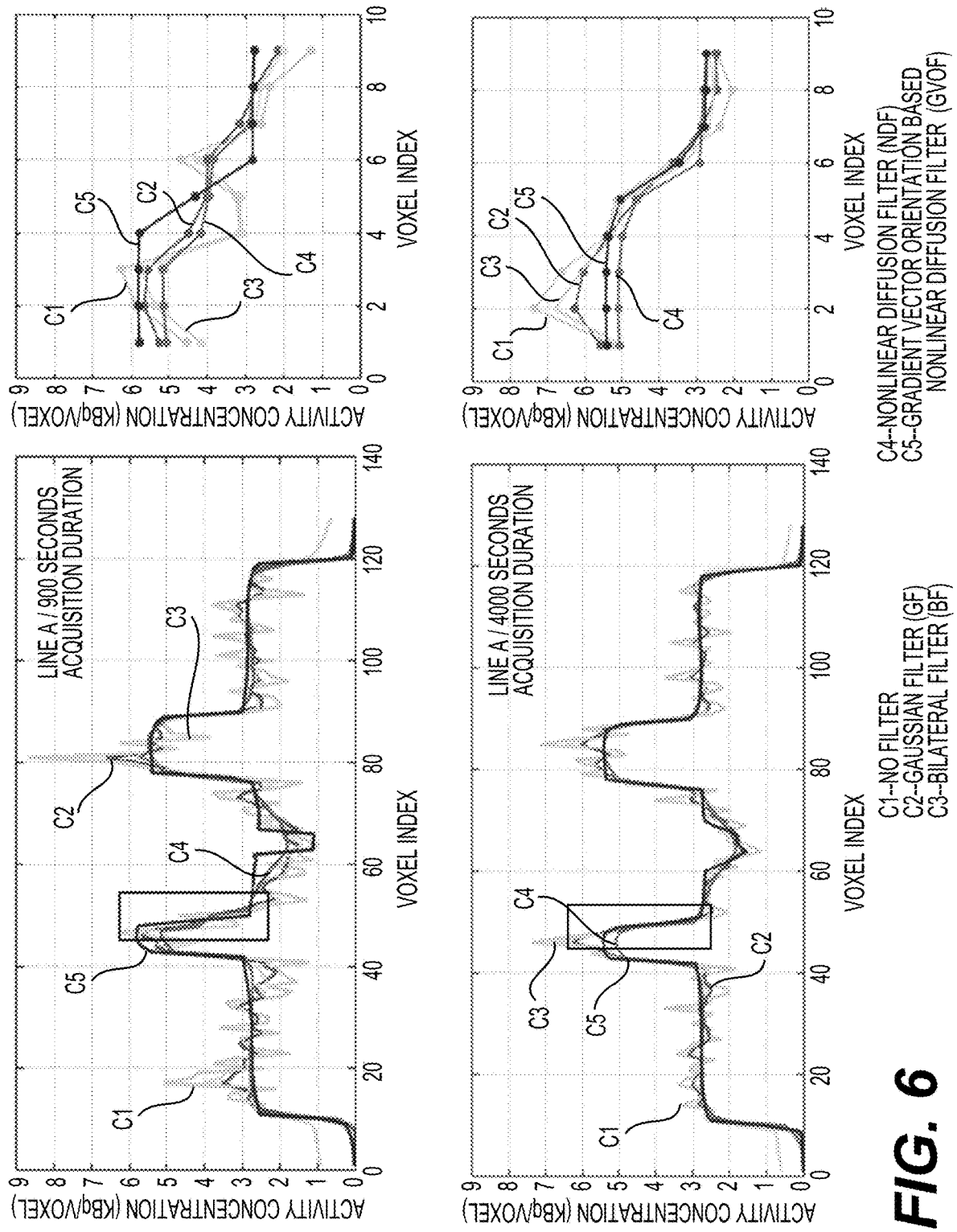
FIG. 6 show profiles at a first location for 900 and 4000 seconds for all filtering methods.
Figure 7:
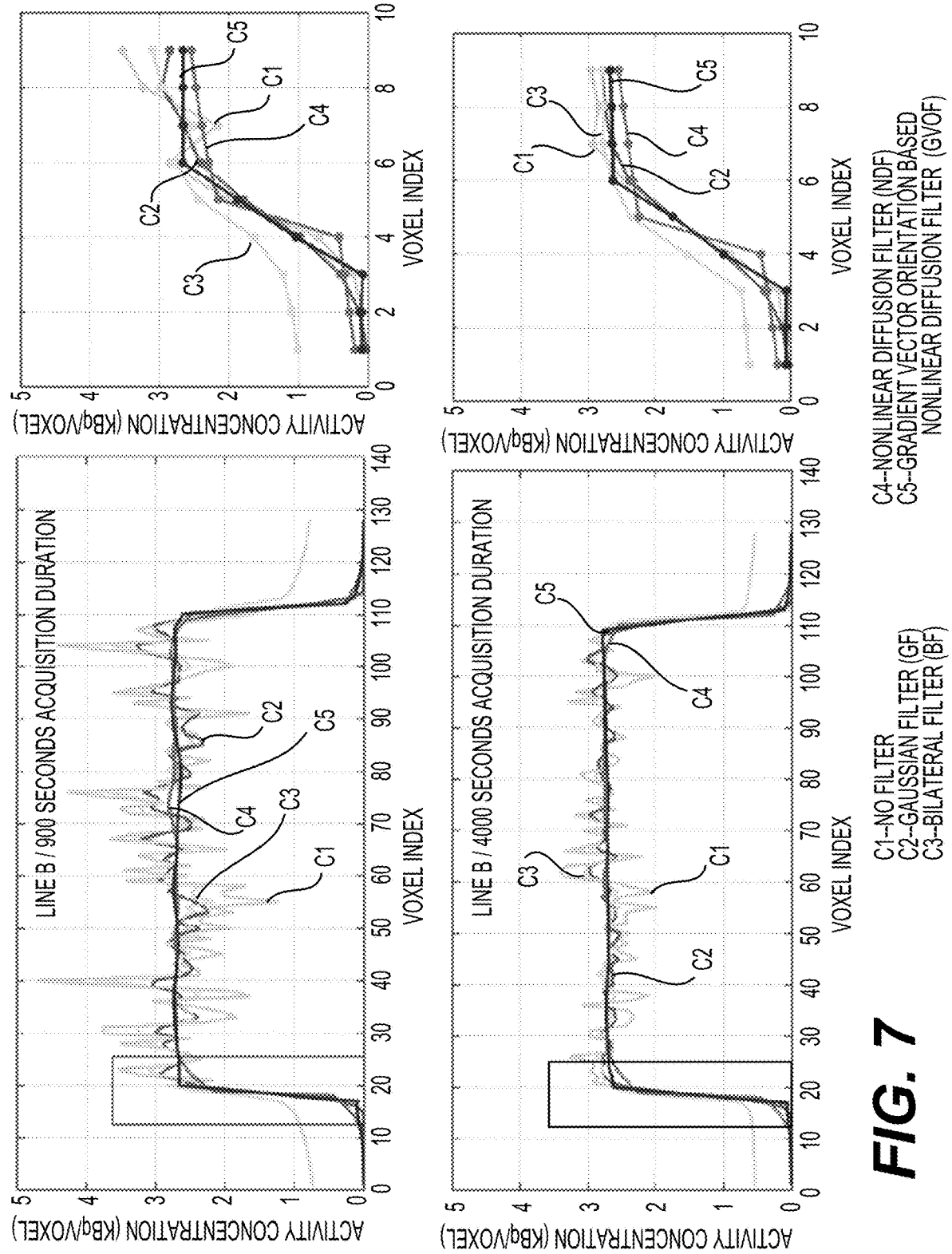
FIG. 7 show profiles at a second location for 900 and 4000 seconds for all filtering methods.

FIG. 6 and FIG. 7 show profiles through line A 511 and line B 512 (shown in the bottom left image in FIG. 5) for 900 and 4000 seconds for all filtering methods. In FIG. 6 and FIG. 7, curves corresponding to different filtering methods are labeled with numerals C1-C5 in the following way: C1 indicates without filtering, C2 indicate a GF filtering, C3 indicates a BF filtering; C4 indicates a DF filtering, and C5 indicates a GVOF filtering.

Specifically, profiles at line A 511 passes through 22 mm and 37 mm spheres, whereas profiles at line B 512 only passes through the uniform background. It can be interpreted from these two sets of profiles that both GF and BF methods reduce noise but are not able to eliminate noise completely, and their performance are very much dependent on the acquisition durations. The performance of NDF method is also very much dependent on the noise level. The GVOF is able to remove noise for both acquisition durations, and its performance is much less dependent on the noise level. The profiles also look remarkably flat for both durations for the GVOF.

FIG. 8 shows mean SNR and coefficient of variation CoV of SNR of five realizations (defined as the ratio of standard deviation over mean) for all methods and contrasts. Mean SNR increases and CoV decreases with the increase in acquisition durations. With the application of filtering, mean SNR increases for all methods. For GF, SNR is improved by 100% compared to no filter for 900 and 1200 seconds. However, for 2000 and 4000 seconds the improvement is less than 70%. GF also improves the CoV. At 2:1 contrast, no significant improvement by applying BF instead of GF is observed. However, at a higher contrast level of 4:1, 18% to 40% improvement is observed depending on the acquisition durations. Even at a higher contrast level, BF does not show any significant improvement in SNR over GF for 900 seconds acquisition duration. CoV is approximately two times higher for BF compared to GF for all noise and contrast levels. Both NDF and GVOF increase the SNR for all cases. The increase in mean SNR for NDF and GVOF is approximately 300% and 200% better than that of no filter and GF methods respectively.

For 900 and 2000 seconds durations, GVOF performs 10% better than NDF. However, CoV of SNR GVOF is 100% lower compared to NDF for 900 and 2000 seconds acquisition durations. As the contrast and acquisition duration increases, difference of CoV between NDF and GVOF is reduced. Overall, the GVOF provides the highest mean SNR and the lowest CoV of SNR irrespective of acquisition duration.

As the results of the experiment, regarding CNR for all methods for each sphere and two contrasts are acquired. CNR for contrast 4:1 for all images is higher compared to contrast 2:1 and it increases with the increase of scanning durations. The average increase in CNR is approximately 275% as the contrast increases from 2:1 to 4:1. At contrast 2:1, for 900 seconds acquisition duration, CNR for 13 mm sphere is 1.21, 2.80, 1.58, 11.36 and 9.24 for no filter, GF, BF, NDF and GVOF respectively. At contrast 4:1, for 900 seconds acquisition duration, CNR for 13 mm sphere is 2.02, 5.51, 12.08, 97.88 and 94.32. CNR for 37 mm sphere for contrast 2:1 is 2.36, 6.49, 4.36, 41.03 and 55.48 for 900 and for contrast 4:1 is 6.15, 17.61, 26.13, 170.35 and 206.31 for 900 acquisition durations.

CNR increases with the changes in size of spheres because contrasts for smaller spheres filled with the same activity are lower due to partial volume effect. GF improves CNR by 100% and 180% for 13 mm sphere and 37 mm sphere respectively compared to no filter. BF does not improve CNR compared to GF for 2:1 contrast. However, for contrast 4:1, BF improves CNR by an average of 85%. For 2:1 contrast, CNR is similar for both NDF and GVOF for 2000 and 4000 seconds acquisition durations and the improvement of CNR is 520% compared to GF method. For 900 and 1200 seconds CNR for GVOF is 35% and 28% better than NDF. For contrast 4:1, GVOF performs better than NDF with the GVOF being 1260% and NDF method being 1080% superior compared to GF. Overall, images smoothed by the GVOF provide the highest CNR irrespective of acquisition durations and contrast.

FIG. 9 shows mean and standard deviation of resolution of five realizations. Average resolution achieved by OSEM reconstruction algorithm without any post reconstruction filtering is 6.40 mm. GF degrades the mean resolution by 1.8 mm to 8.20 mm. However, standard deviation of resolution between different measurements is improved with GF. The mean resolutions over all acquisition durations provided by BF and NDF method are 6.45 mm and 6.75 mm respectively which is similar to no filter case. However, NDF provides lower standard deviation compared to both no filter and BF methods but higher than that of GF method. The average resolution achieved by GVOF is 5.8 mm and is similar across all noise levels. The standard deviation is also lowest compared to all other methods.

As the results of the experiment, maximum activity (analogous to $SUV_{max}$) of all five realizations for contrast 2:1 and 4:1 for all spheres and filtering methods are calculated. Mean and standard deviation (as a measure of variance) for five realizations along with the measured activity that was used to fill the spheres are also acquired. Percentage biases in comparison to the actual activity are also calculated. Maximum activity estimated from images with different filters is very much dependent on the size of sphere. No filter and BF method always overestimate the maximum activity with a very high standard deviation for both contrasts except for 10 mm sphere. Hence, percentage biases for both the methods are positive and higher than all three other methods. With the increase of acquisition duration, both variance and bias reduce for these two methods. However, percentage biases provided by these two methods is higher for 22 mm, 28 mm and 37 mm spheres compared to 13 mm and 17 mm spheres for same acquisition duration for both contrasts. Since 10 mm sphere is too small for evaluation, variance and bias analysis of this sphere was omitted from further analysis.

Because of presence of noise, maximum activity is usually overestimated. Since smaller volumes are subject to higher partial volume effects and spill over, noise is compensated by PVE and spill over and bias is higher for bigger volumes. More systematic for 22, 28 and 37 mm spheres others are not due to complex combined effects of partial volume, spill over and noise. Smaller volume are subject to more noise due to lower uptake due to PVE and spill over.

With the application of GF, the estimated maximum activity is lower compared to no filter. Standard deviation also reduces for all cases with SD at contrast level 2:1 being higher than that of contrast level 4:1. GF provides lowest bias for 13 mm and 17 mm spheres for both contrasts with the bias for contrast 4:1 being marginally better for these two spheres. With the increase of sphere sizes bias provided by GF also increases and is dependent on acquisition duration. For sphere size bigger than 17 mm at contrast level 2:1, the maximum bias is 33.82 for 37 mm sphere and 900 seconds acquisition duration and the minimum is 11.16 for 22 mm sphere and 4000 seconds acquisition duration. For contrast 4:1 the values are 27.72 and 6.38 respectively. On an average bias provided by GF is approximately 30% higher for contrast 2:1 compared to contrast 4:1 for 22 mm, 28 mm and 37 mm spheres.

For contrast level 2:1 and for 13 mm and 17 mm spheres, bias provided by NDF and GVOF are negative implying that maximum activity estimated by this two methods are lower than the measured activity. For contrast 4:1, the similar trend in bias is only observed for 13 mm sphere. Bias for NDF is lower than GF but with higher standard deviation for 22 mm, 28 mm and 37 mm spheres. Both bias and SD for NDF is vary according to the acquisition durations with 900 seconds duration having the highest bias and 4000 seconds duration has the lowest) for both contrast. However, bias at contrast 4:1 are lower for NDF compared to that of contrast 2:1- 21.53% and 18.69% for contrast 2:1 and 4:1 respectively for 900 seconds and 6.88% and −0.75% for 4000 seconds.

Biases for GVOF vary from 0.00% (37 mm and 4000 seconds for contrast 4:1) to 6.21% (22 mm and 900 seconds for contrast 2:1) for 22 mm, 28 mm and 37 mm diameter sphere. SD of estimated maximum activity provided by GVOF is the lowest compared to other methods for these three spheres.

As the results of the experiment, reproducibility between highest and lowest maximum activity for each sphere for each method is acquired. With the application of filtering, reproducibility increases for all method except BF. Reproducibility for all methods is dependent on the contrast, acquisition durations and size. Since maximum activity estimated in 10 mm sphere is not evaluable, it is discarded from further reproducibility analysis. For 13 mm and 17 mm spheres, percentage difference for no filter images vary from 15% to 44.55% for contrast 2:1 and 8.65% to 42.39% for contrast 4:1 based on acquisition duration. GF improved reproducibility by reducing percentage difference. Percentage difference for GF varies from 6.67% to 23% for contrast 2:1 and 3.49% to 17.51% for contrast 4:1. Reproducibility of BF is worse than even no filter and vary from 18.67% to 54.22% for contrast 2:1 and 10.48% to 47.54% for contrast 4:1. NDF and GVOF improve reproducibility compared to no filter but degrades compared to GF for contrast 2:1 with 6.14%-30.60% for NDF and 2.65%-44.45% for GVOF. However, for contrast 4:1, reproducibility is comparable to GF for both NDF and GVOF (2.85%-18.28% and 2.27%-19.71% respectively).

Reproducibility for no filter case for 22 mm, 28 mm and 37 mm spheres vary from 6.70% to 42.10% for contrast 2:1 and 5.84% to 22.68% for contrast 4:1. Higher percentage difference is due to lower acquisition durations. Similar to smaller sphere sizes, GF improves reproducibility by reducing percentage difference between two estimations by half of that of no filter for both contrast (2.62%-20.45% and 2.63%-11.73% respectively). Reproducibility for BF is approximately two times higher than that of GF for both contrasts for the largest three spheres. The reproducibility of AD for these spheres vary from 0.84% to 32.22% for contrast 2:1 and 1.33% to 15.72% for contrast 4:1. The GVOF provides reproducibility that varies from 1.1% to 20.65% and 1.3% to 10.80% for contrast 2:1 and contrast 4:1 respectively and comparable to GF. Overall, GF and GVOF provide the best reproducibility for sphere bigger than 17 mm diameter.

The current disclosure describes methods and systems to remove noise from medical images. The methods and systems utilize combined information provided by both gradient magnitude and gradient vector direction, and overcome limitations of several other methods. The GVOF performs robustly across changes in image contrast and noise and does not require adjusting parameters (e.g., iteration number, values etc.) for differential uptakes. Along with the higher SNR, CNR and resolution, the GVOF provides the best quantitative accurate results (percentage bias, variance and reproducibility) for lesions with size greater than three times of the PET intrinsic resolution. This makes the GVOF an strong alternative to Gaussian filter that are currently used in state-of-the-art clinical PET systems to provide smoothed images for the purpose of both diagnosis and response assessment.

Figure 10:
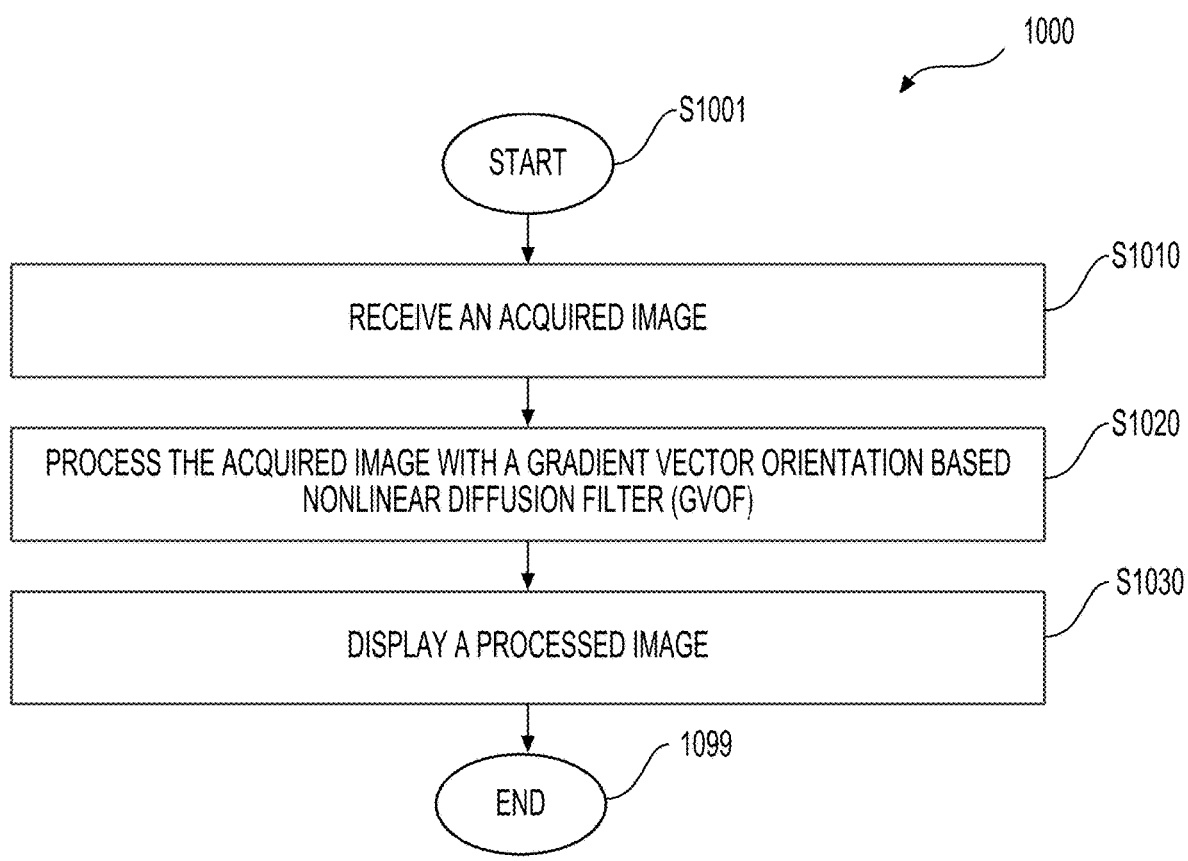
FIG. 10 shows an example image processing process according to some embodiments of the disclosure.

FIG. 10 shows an example image processing process 1000 according to some embodiments of the disclosure. The process 1000 can start from S1001 and proceed to S1010.

At S1010, an acquired image can be received. For example, the acquired image can be a medical image, such as an X-ray image, a computed tomography (CT) image, an magnetic resonance imaging (MM) image, an ultrasound image, a nuclear medicine image, a positron emission tomography (PET) image, a single-photon emission computed tomography (SPECT)) image, and the like. The acquired image can be a 2D or 3D medical image. In alternative examples, the acquired image can be other types of images, such as an astronomical image.

At S1020, the acquired image is processed with a denoising filter, such as the GVOF to generate a filtered image. The filtering process can remove or reduce noise in the acquired image and preserve edge structures in the acquired image. Particularly, the GVOF has a diffusion coefficient that can be calculated using both gradient vector magnitude information and gradient vector orientation information. Due to randomness of gradient vector orientations near a false structure, the diffusion coefficient may have a large value close to 1, and accordingly a heavy smoothing may be performed near the false structure to remove to false structure. In contrast, orientations of gradient vectors near an edge structure can be uniform. Combined with gradient magnitude information, a diffusion coefficient with a small value may result, stopping diffusion near the edge structure. Thus, application of the GVOF can remove false structures while preserving edge structures in acquired images.

At S1030, the filtered image is displayed to a user. For example, the filtered image can be displayed on a computer monitor, or printed out for a doctor. In alternative examples, the filtered image may undergo other processing steps before being displayed on a display device. The process 1000 proceeds to S1099 and terminates at S1099.

Figure 11:
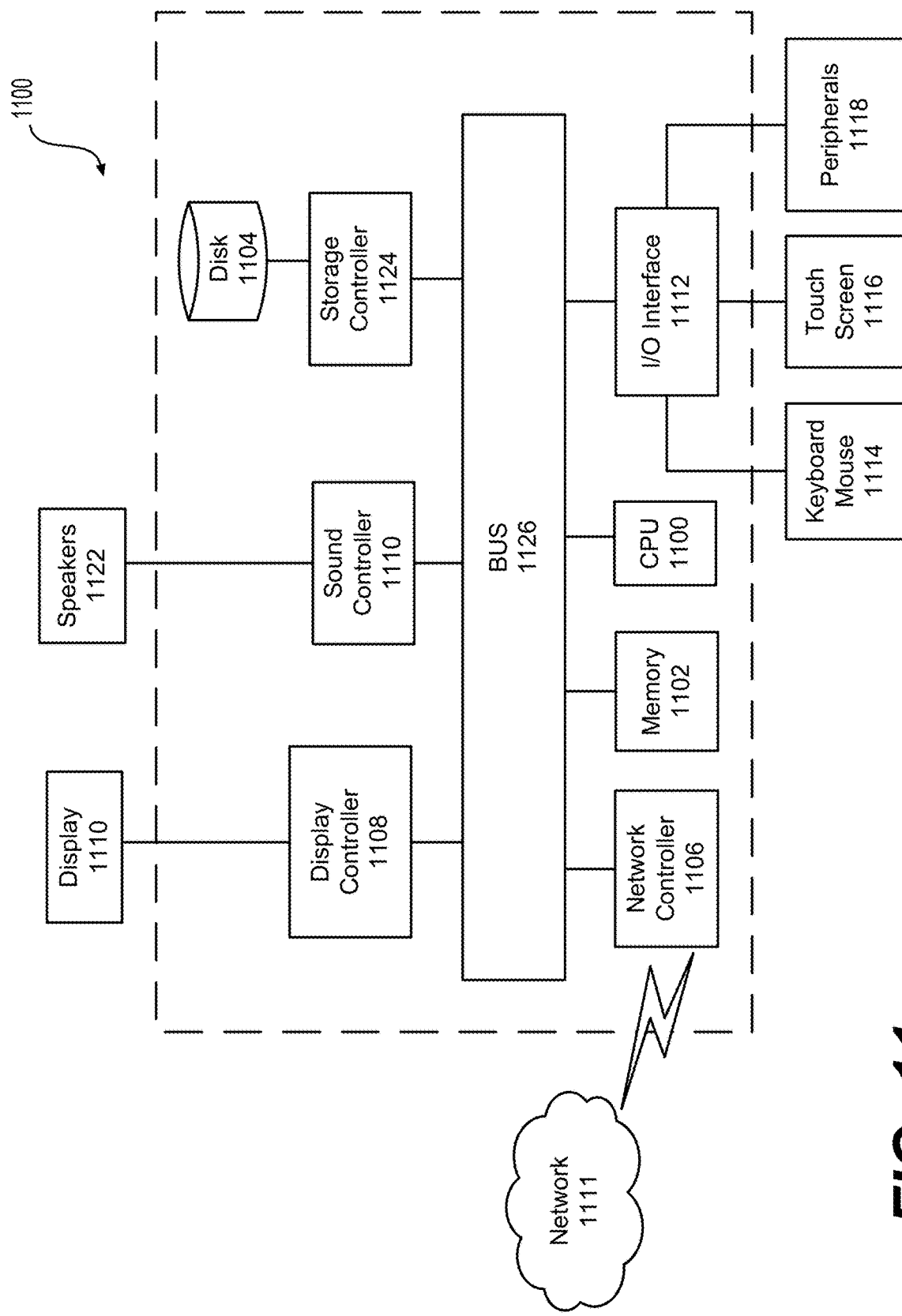
FIG. 11 shows an example computer for implementing systems and methods described herein according to some embodiments.

FIG. 11 shows an example computer 1100 for implementing systems and methods described herein according to some embodiments. The computer 1100 can include a memory 1102 and a CPU 1100. For example, the computer 1100 can be used to implement the image processing process 1000 in FIG. 10 example. The computer 1100 can also be used for implementing components in the image acquisition system 100, such as the denoising filter 120, the display device 130, and the like. For example, program instructions for performing functions of the denoising filter 120 or steps of the image denoising process 1000 can be stored in the memory 1102. The CPU 1100 can execute the program instructions to perform the functions of the denoising filter 120 or the steps of the image denoising process 100. Thus, claimed advancements in this disclosure can be realized.

The program instructions for performing functions of the denoising filter 120 or steps of the image denoising process 1000 can be stored in a disk 1104, such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computer 1100 communicates, such as a server or computer.

Further, the claimed advancements may be provided as a utility application, background daemon, or component of an operating system, or combination thereof, executing in conjunction with CPU 1100 and an operating system such as Microsoft Windows 7, UNIX, Solaris, LINUX, Apple MAC-OS and other systems known to those skilled in the art.

For example, CPU 1100 may be a Xenon or Core processor from Intel of America or an Opteron processor from AMD of America, or may be other processor types that would be recognized by one of ordinary skill in the art. Alternatively, the CPU 1100 may be implemented on an FPGA, ASIC, PLD or using discrete logic circuits, as one of ordinary skill in the art would recognize. Further, CPU 1100 may be implemented as multiple processors cooperatively working in parallel to perform the instructions of the inventive processes described above.

The computer 1100 can also include a network controller 1106, such as an Intel Ethernet PRO network interface card from Intel Corporation of America, for interfacing with network 1111. As can be appreciated, the network 1111 can be a public network, such as the Internet, or a private network such as an LAN or WAN network, or any combination thereof and can also include PSTN or ISDN subnetworks. The network 1111 can also be wired, such as an Ethernet network, or can be wireless such as a cellular network including EDGE, 3G and 4G wireless cellular systems. The wireless network can also be WiFi, Bluetooth, or any other wireless form of communication that is known.

The computer 1100 further includes a display controller 1108, such as a NVIDIA GeForce GTX or Quadro graphics adaptor from NVIDIA Corporation of America for interfacing with display 1110, such as a Hewlett Packard HPL2445w LCD monitor. A general purpose I/O interface 1112 interfaces with a keyboard and/or mouse 1114 as well as a touch screen panel 1116 on or separate from display 1110. General purpose I/O interface also connects to a variety of peripherals 1118 including printers and scanners, such as an OfficeJet or DeskJet from Hewlett Packard.

A sound controller 1120 is also provided in the computer, such as Sound Blaster X-Fi Titanium from Creative, to interface with speakers/microphone 1122 thereby providing sounds and/or music.

The general purpose storage controller 1124 connects the storage medium disk 1104 with communication bus 1126, which may be an ISA, EISA, VESA, PCI, or similar, for interconnecting all of the components of the computer 1100. A description of the general features and functionality of the display 1110, keyboard and/or mouse 1114, as well as the display controller 1108, storage controller 1124, network controller 1106, sound controller 1120, and general purpose I/O interface 1112 is omitted herein for brevity as these features are known.

The processes and functions described herein can be implemented as a computer program which, when executed by one or more processors, can cause the one or more processors to perform the respective processes and functions. The computer program may be stored or distributed on a suitable medium, such as an optical storage medium or a solid-state medium supplied together with, or as part of, other hardware. The computer program may also be distributed in other forms, such as via the Internet or other wired or wireless telecommunication systems. For example, the computer program can be obtained and loaded into an apparatus, including obtaining the computer program through physical medium or distributed system, including, for example, from a server connected to the Internet.

The computer program may be accessible from a computer-readable medium providing program instructions for use by or in connection with a computer or any instruction execution system. A computer readable medium may include any apparatus that stores, communicates, propagates, or transports the computer program for use by or in connection with an instruction execution system, apparatus, or device. The computer-readable medium can be magnetic, optical, electronic, electromagnetic, infrared, or semiconductor system (or apparatus or device) or a propagation medium. The computer-readable medium may include a computer-readable non-transitory storage medium such as a semiconductor or solid state memory, magnetic tape, a removable computer diskette, a random access memory (RAM), a read-only memory (ROM), a magnetic disk and an optical disk, and the like. The computer-readable non-transitory storage medium can include all types of computer readable medium, including magnetic storage medium, optical storage medium, flash medium, and solid state storage medium.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A clinical medical image denoising method for clinical analysis and/or medical intervention, comprising:
   acquiring a clinical medical image by imaging a human body with an image acquisition system,
   receiving the clinical medical image on a computing device having a memory and a processor from the image acquisition system; and
   processing, with the processor of the computing device, the clinical medical image with a nonlinear diffusion coefficient based filter having a diffusion coefficient that is calculated using gradient vector orientation information in the clinical medical image to provide a denoised image,
   displaying the denoised image on a display device,
   wherein the nonlinear diffusion coefficient based filter is defined by following partial-differential-equation, $$\frac{\partial I(x, y, t)}{\partial t} = \nabla \cdot [c(x, y, t)\nabla I(x, y, t)],$$

$$I(t = 0) = I_0,$$

where I(x,y,t) represents an image, (x, y) represents a position of pixel in the image, t is a parameter indicating a scale level in a scale space of the image I(x,y,t), $I_0$ represents an initial image with t=0, $\nabla \cdot$ and $\nabla$ are divergence and gradient operators, respectively, and c (x, y,t) is the diffusion coefficient at a pixel located at position (x, y), and
   wherein the diffusion coefficient is defined as, $$c(x, y, t) = \exp\left[-\left(\frac{\|\nabla I_\sigma(x, y, t)\| \times \alpha_\sigma(x, y, t)}{k}\right)^2\right],$$

where $I_\sigma$(x,y,t) represents a smoothed image that is the initial image $I_0$ smoothed with a Gaussian kernel having a width of σ, k is a noise threshold, $\alpha_\sigma$(x, y,t) is a term carrying gradient vector orientation information.

2. The method of claim 1, further comprising:
   processing the clinical medical image with the nonlinear diffusion coefficient based filter having the diffusion coefficient that is calculated using both gradient vector magnitude information and gradient vector orientation information in the clinical medical image.

3. The method of claim 1, wherein the term carrying gradient vector orientation information is defined as, $$\alpha_\sigma(x, y, t) = \left|\sum_{i=1}^{p}\sum_{j=1}^{q}\cos(\theta_{(i,j,t)})\right| = \left|\sum_{i=1}^{p}\sum_{j=1}^{q}\frac{\nabla I_\sigma(x, y, t) \times \nabla I_\sigma(i, j, t)}{\|\nabla I_\sigma(x, y, t)\| \times \|\nabla I_\sigma(i, j, t)\|}\right|,$$

wherein p×q represents a size of a window in terms of pixels that surrounds a position (x, y) in the smoothed image $I_\sigma$(x,y,t), $\theta_{(i,j)}$ is an angle between a gradient vector $\nabla I_\sigma$(i,j,t) and a gradient vector $\nabla I_\sigma$(x,y,t).

4. The method of claim 1, wherein the image acquisition system is one of an X-ray image, a computed tomography (CT) image, a magnetic resonance imaging (MRI) image, an ultrasound image, a nuclear medicine image, a positron emission tomography (PET) image, and a single-photon emission computed tomography (SPECT)) image.

5. The method of claim 1, wherein the clinical medical image is a two-dimensional (2D) or three-dimensional (3D) medical image.

\* \* \* \* \*